Figure 1:
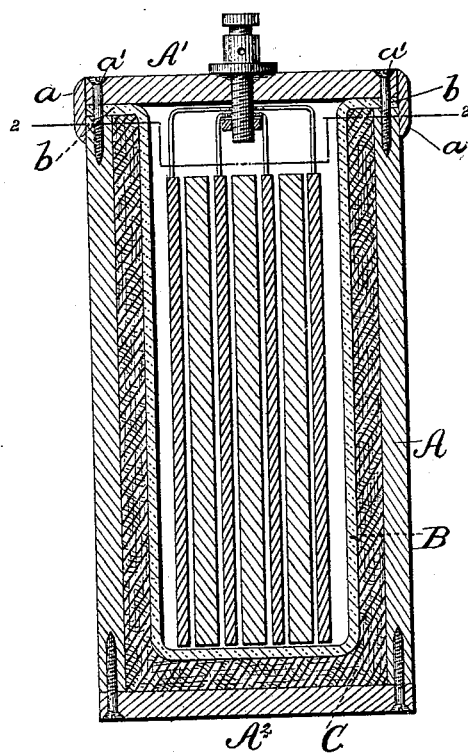

(No Model.)

E. T. STARR.
BATTERY BOX OR VESSEL.

No. 282,795. Patented Aug. 7, 1883.

WITNESSES:
Harry King
James Young.

INVENTOR:
Eli T. Starr,
by Wm. L. Peyton, Attorney

UNITED STATES PATENT OFFICE.

ELI T. STARR, OF PHILADELPHIA, PENNSYLVANIA, ASSIGNOR OF ONE-HALF TO WILLIAM J. PEYTON, OF WASHINGTON, DISTRICT OF COLUMBIA, AND H. M. LEWIS AND JAMES W. WHITE, OF PHILADELPHIA, PENNSYLVANIA.

BATTERY BOX OR VESSEL.

SPECIFICATION forming part of Letters Patent No. 282,795, dated August 7, 1883.

Application filed May 7, 1883. (No model.)

*To all whom it may concern:*

Be it known that I, ELI T. STARR, of the city and county of Philadelphia, in the State of Pennsylvania, have invented certain new and useful Improvements in Boxes or Vessels for Holding Acids and Liquids, of which the following is a specification.

My invention relates to a box or vessel more especially designed for use as a battery box or vessel to contain the electrodes of an electric battery and the liquid thereof.

In the use of electric batteries, particularly of secondary batteries, when comparatively large vessels for the electrodes and fluid are necessary, much difficulty has been encountered in constructing a box which is fluid-tight and will remain so notwithstanding rough handling or usage. In fact, as far as I am aware, such a box or vessel had not been devised prior to my invention, although many attempts have been made in this direction. Plain wooden or similar boxes, although carefully made, will remain tight but a short while, the dilute acid soon destroying them in this regard. Battery-boxes have been made in many ways in attempting to reach success. For instance, wood or other boxes have been lined with lead, vulcanized rubber, soft rubber, or thin sheets of rubber or rubber compound, or fabrics — such as gossamer-cloth. Such boxes have also been lined with glass or a vitreous or other lining or cement, with the box in some cases thoroughly saturated with a preservative oil or wax, or with paraffine. All such boxes have resulted in failures, as far as I am aware, due to inefficiency, expense, too great weight, or incapability of resisting the action of the acid or other fluid of the battery. The solder at the points of the lead-lined vessels is soon destroyed or loosened, and leakage ensues. The efficiency of soft-rubber-lined boxes is soon destroyed by the heating of the box or liquid due to charging the battery, while the glass or cement lined box is soon destroyed by the breaking or cracking of the lining by even careful handling of the box. Boxes or tanks have also been made of two wooden boxes, one placed inside the other and separated by an interposed lining or packing of coal-tar or cement, for instance, and also such compound vessels have been constructed, with the interior vessel of glass or vitreous material, in sections. These two latter forms were about the best forms prior to my invention; but the glass vessels of the one form are liable to fracture and loose joints, while the interior wooden vessels of the other form are soon destroyed by the action of the acid of the battery on the fatty or non-fibrous portions of the wood, which soon causes leakage, and, in addition, the interior vessel becomes water-logged or saturated with the liquid, and very heavy. One of the great defects in these compound vessels or boxes also is the almost total inability to get a continuous impervious lining between the two vessels, as the melted material, being poured into the space between the two vessels at the top, cools and chokes up the passage, and prevents the formation of a continuous solid layer at the bottom and sides without great care and attention. I have made battery-boxes of each of the above description in my attempts to get a satisfactory box for secondary batteries; but no one of them fulfills the requirements demanded. I have, however, devised a battery-box which practice has demonstrated meets the essential requirements of such a box, it being fluid-tight, comparatively cheaply made, strong and durable, and possessing the capability of being readily rendered fluid-tight without taking the box apart should the box be strained by rough handling or transportation, so as to cause leakage.

The subject-matter claimed is particularly pointed out at the close of the specification.

In the accompanying drawings I have shown my improvements as embodied in the best way now known to me. Some of my said improvements may be used without the others, and my improved box or vessel is well adapted for other uses than as an electric battery box or vessel.

Figure 2:
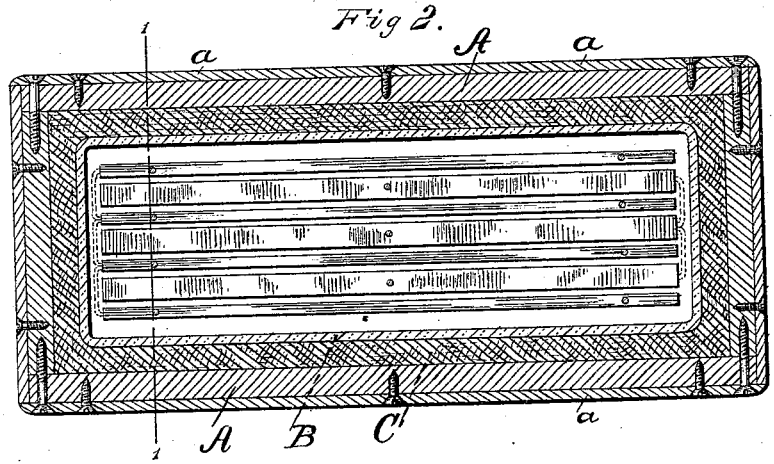

In said drawings, Figure 1 is a vertical central section through my improved box or vessel as a battery-box, the electrodes being in place and connected with the cover. Fig. 2 is a plan view thereof with the cover removed, the electrodes remaining in the vessel.

The exterior vessel, A, is preferably made of wood and rectangular in shape, although this is not essential. The interior vessel, B, may be made of paper compound capable of resisting the corrosive and destructive action of acids—such as used in batteries. I have found papier-maché compound to answer a good purpose. Other materials may be employed for the interior vessel which should be comparatively light, though strong. Glass and hard rubber will answer fairly for the inside vessel. I prefer a material that can be molded without seams, and with a lap or flange, b, at the top, to cover or close the space between the two vessels. This lap or flange b, in some instances, serves a good purpose to constitute or receive the packing between the lid and vessel, upon which latter the lid, top, or cover A' of the compound vessed is fastened fluid-tight by detachable fastenings—screws a', for instance. The interior vessel, B, is smaller and shorter than the outer vessel, A, and is fitted therein so as to form a space, preferably from a quarter to a half inch wide all around and between the sides and bottoms of the vessels. I prefer the space between the bottoms of the two vessels to be deeper than that at the sides, to accommodate a somewhat greater thickness of the lining or packing C between said vessels. This lining I prefer to be ordinary acid-proof roofing-cement or coal-tar, which is solid when cold, but capable of being readily melted or liquified by heat at a low temperature, to again become set or hard and solid by cooling.

In constructing my improved compound box or vessel I employ a new step in the process of filling the space between the outer and inner vessels with the lining. I construct the bottom A² of the outer vessel separable. The two vessels having been fitted together, the top A' is preferably fastened on. The compound vessel is then turned bottom up, and the cement or other material, having been brought to a fluid condition by heat, is poured into the space between the two vessels from the bottom. This insures a perfect flow of the lining entirely around the sides of the vessel, completely filling the space between them with a continuous lining, and as the space at the bottom, which is the most important point, is the last to receive its filling, the operation is performed with rapidity and completeness, and a continuous lining at the bottom is insured, as the space is perfectly open. When the space at the sides, as well as the bottom, is filled, the bottom A² of the outer vessel is securely fastened in place against the lower end of the lining. I prefer to fasten the bottom A² in place, if the outer vessel is of wood, by means of stout wooden pins driven through holes arranged around the edge of the bottom A² into corresponding holes in the sides of the vessel A. Of course any other suitable fastening may be employed to secure the bottom A² in place, screws being shown in Fig. 1. As soon as the cement or tar cools it sets or hardens, and becomes a solid impervious lining, and effectually prevents leakage, the compound box being capable of very rough usage and transportation without causing it to leak. Should the box be caused to leak by violent or long continuous service, it is only necessary to heat the box sufficiently to cause the lining to run together at the points of fracture or leakage (which it will do with the application of heat at a low temperature, insufficient to injure the box from that cause) to again render the box fluid-tight and secure.

It is not absolutely necessary that the inner vessel, B, should be provided with the lap or flange b. A suitable separate closing-strip may be employed to close the space at the top of the box when receiving its lining.

I prefer the compound box to be provided at its top with flanges or guides a, within which the cover A' of the box fits snugly, whereby, in applying the top of the box, it is guided properly to its place. This is highly desirable when the electrodes of the battery are connected with or suspended from the top or cover A', as thereby the proper position of the electrodes in the vessel is readily assured. In addition to this the flanges aid in making a fluid-tight joint at the top of the box, which in batteries designed for transportation and use—for instance, as a source of light upon cars—is highly desirable. I have shown the electrodes in this example as of plate form—for instance, lead plates. The positive plates are connected up at one end of the box and the negative plates at the other. The particular arrangements of the electrodes of the battery constitute no part of this invention.

I claim herein—

1. The compound battery-vessel, consisting of the outer vessel, the inner seamless vessel, and the solid impervious continuous lining between the sides and bottoms of said vessels, substantially as described.

2. The compound battery-vessel, consisting of the outer vessel having a separable bottom, the interior vessel fitted within said outer vessel, and connected therewith at its upper end by a flange or extension, and the solid impervious continuous lining between the sides and bottoms of said vessels, substantially as described.

In testimony whereof I have hereunto subscribed my name this 3d day of April, A. D. 1883.

ELI T. STARR.

Witnesses:
WM. J. PEYTON.
F. C. HAUNSTIED.